May 8, 1962 R. C. MIERENDORF ET AL 3,034,024
CONTROL CIRCUIT
Filed Oct. 25, 1957
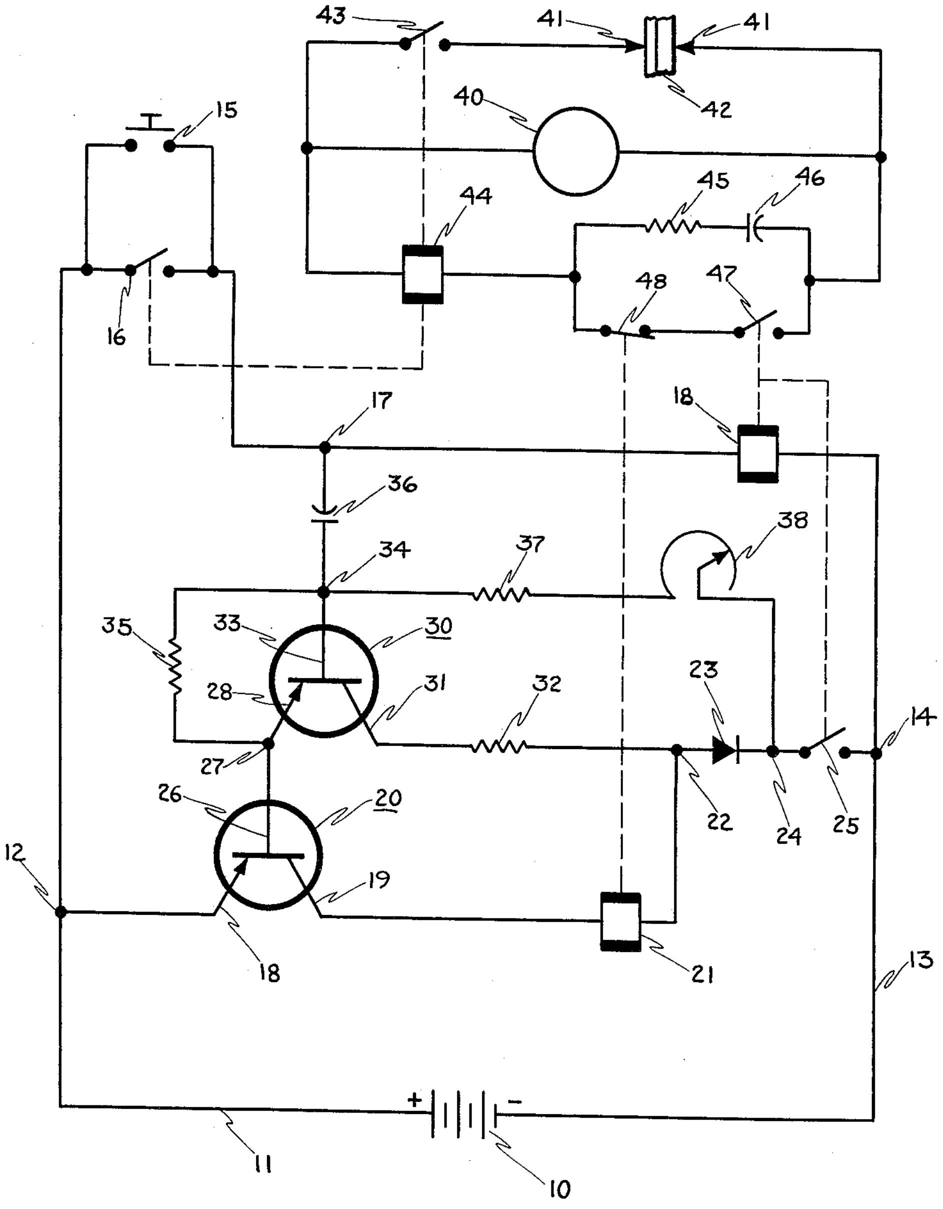
INVENTOR.
ROBERT C. MIERENDORF
MARVIN A. GUETTEL
BY
William H. Schmeling 3,034,024

CONTROL CIRCUIT

Robert C. Mierendorf, Wauwatosa, and Marvin A. Guettel, Milwaukee, Wis., assignors to Square D Company, Detroit, Mich., a corporation of Michigan Filed Oct. 25, 1957, Ser. No. 692,471
9 Claims. (Cl. 317—148.5)

This invention relates to control circuits and is more particularly concerned with a transistorized timing circuit that is particularly adapted for use with portable welders.

The general purpose of the present invention is to provide a small light weight accurate portable weld timer which will operate without an external power source. While mechanical timers such as pneumatically operated timers have proven satisfactory when used in portable welders, it has been found that variations in timing occasionally occur because of changes in temperature, humidity and wear. The transistorized timer according to the present invention will overcome these difficulties and will provide certain other advantages which will become hereinafter apparent.

It is an object therefore of the present invention to provide a new and novel transistorized timing circuit.

Another object of the present invention is to provide a transistorized timing circuit for a welder.

A further object of the present invention is to provide a transistorized timing circuit wherein the timing capacitor is charged through the bases of the transistors while the transistors are non-conducting.

A still further object of the present invention is to provide a timing circuit for a welder wherein the timing capacitor is charged through transistors during standby conditions and discharges to control the conduction of the transistors after the initiating switch is closed.

Further objects and features of the invention will be readily apparent to those skilled in the art from the specification and appended drawing illustrating a preferred embodiment in which:

The single FIGURE shows a schematic wiring diagram of the transistorized timing circuit according to the present invention.

In the drawing, the numeral 10 designates a D.C. current and voltage source. While in the embodiment shown, the current source 10 is designated as a storage battery which may be of any of the well known wet or dry cell types, it is also apparent that the current and voltage for the timing circuit to be hereinafter explained may be derived directly from a D.C. generator or a suitable A.C. source which output is rectified to D.C. by well known components.

The source 10 has its positive terminal connected though lead 11 to junction 12 and its negative terminal connected through lead 13 to junction 14. Connected between junction 12 and 14 is a series circuit which includes parallel normally open switch contacts 15 and 16, junction 17 and the energizing coil of a relay 18. Also connected in series circuit between junction 12 and 14 is the emitter 18 and collector 19 of transistor 20, the energizing coil of relay 21, junction 22, the diode 23, junction 24, and the normally open switch contacts 25 which are closed when relay 18 is energized. The base 26 of the transistor 20 is connected through a junction 27 with the emitter 28 of transistor 30 which has its collector 31 connected through a resistance 32 to junction 22. The base 33 of transistor 30 is connected to a junction 34. Connected between junctions 27 and 34 is a resistance 35 and connected between the junctions 34 and 17 is the timing capacitor 36. Connected in series between junctions 34 and 24 is a minimum resistance 37 and a potentiometer resistance 38.

The D.C. generator 40 shown in the drawing supplies the necessary current to the welding electrodes 41 to weld the pieces of work 42 together in the conventional manner. The current to the welding electrodes 41 is controlled by the closing of normally open switch contacts 43 when the coil of relay 44 is energized from the generator 40 through the circuit which includes the resistance 45, the capacitor 46, the normally open switch contacts 47 which are closed when relay 18 is energized and the normally closed switch contacts 48 which are opened when relay 21 is energized.

*Operation*

When the system is in standby, that is before the initiating switch 15 is moved to the circuit closing position, switches 15, 16, 25, 43, and 47 will be open and switch 48 will be closed. The capacitor 36 will be charged from the source 10 through a series circuit which includes; lead 11, junction 12, emitter 18, base 26, junction 27, emitter 28, base 33, junction 34, capacitor 36, junction 17, the coil of relay 18, junction 14 and lead 13 until the charge of the capacitor 36 equals the output potential of source 10. When switch 15 is closed, the coil of relay 18 will be energized from the source 10 through a circuit which includes lead 11, junction 12, switch 15, junction 17, relay 18, junction 14 and lead 13. The relay 18 when energized will cause switch contacts 47 and 25 to close. When switch 47 closes, the relay 44 is energized to close switch contacts 16 and 43. Switch contacts 16 form a holding circuit around the initiating switch 15 and switch contacts 43 when closed, complete the circuit between the generator 40 and the welding electrodes 41. The time interval for current flow through the weld electrodes 41 is controlled by the discharge of capacitor 36.

When switch contacts 25 close, a discharge path for capacitor 36 is completed through the circuit which includes; junction 34, resistance 37, potentiometer 38, junction 24, closed switch 25, junction 14, lead 13, source 10, lead 11, junction 12, closed switch 16, and junction 17. It will be seen that the time rate of this circuit will be determined by the value of resistance 37 and the setting of potentiometer 38. It will be further noted the capacitor is in series with the source 10. The emitter 18 is effectively tied to the junction 17 side of capacitor 36 while the bases 33 and 26 are tied to the junction 34 side of capacitor 36. Thus initially the emitter 18 will be negative relative to base 26 and emitter 28 will be negative to base 33 so the transistors 20 and 30 will be non-conducting and will remain non-conducting until base 33 is negative relative to the emitter 28. As was heretofore stated, the capacitor 36 during discharge is connected in series with the source 10. When switch 25 is closed the source will tend to reverse the initial charge on the capacitor to make the base 33 slightly negative relative to emitter 28. When this occurs transistor 30 conducts through diode 23 and causes the base 26 of the amplifier transistor 20 to become negative relative to the emitter 18. Thus transistor 20 conducts to energize the time delay relay 21 through a circuit which includes diode 23. When relay 21 is energized it will open switch contacts 48 to de-energize relay 44. The deenergization of relay 44 opens switch contacts 43 to cause the current flow to weld electrodes 41 to cease, ending the weld period, and also to open switch contacts 16 thereby deenergizing relay 18 assuming that the initiating switch has previously been released.

From the foregoing it is apparent that the resistance 35 serves as a cut-off bias for the transistor 20 and the resistance 32 provides a load for collector 31. The resistance 37 provides a minimum time rate discharge for capacitor 36 which may be in the order of three cycles and the potentiometer 38 increases the duration of the time discharge of capacitor 36 to a value which may be as large as 120 cycles. The diode 23 as well known, acts as a blocking rectifier to prevent reverse current flow through the transistors. The resistance 45 and the capacitor 46 together act as arc suppressors across the switch contacts 48 and 47 during opening and closing thereof.

From the above it is apparent that the system shown utilizes a single battery which, if of the mercury type, will yield repeated accuracy even to the end of the battery life. Further, it is apparent that the battery drain during standby would be very small and will be due solely to the leakage of the timing capacitor 36. The cascaded amplifier which includes transistors 20 and 30 will permit the use of heavy duty type relays instead of the ultrasensitive type which are generally utilized in transistor circuits. Further, it is apparent that the transistor 20 may be eliminated if desired. When this arrangement is employed the relay coil 21 replaces the resistance 32 in the circuit. However, if this arrangement is employed, the sensitivity of the relay 21 will have to be considerably increased. The circuit shown possesses the advantage that the timing capacitor 36 is charged during standby conditions. This will yield consistent timing results even after long idle periods of the apparatus. In circuits without this feature, the timing capacitor must form-up after long idle periods. Thils will yield variations in timing during the form-up periods. The circuit is fail safe, that is, in the case of batery failure, no weld will occur since the relay 18 will not be sufficiently energized to begin the welding cycle. Further, in case of battery deterioration, the circuit is fail safe as the relay 18 is preferably less sensitive, i.e., requires more voltage, than the relay 21 which operates to interrupt the weld current. In other words, if sufficient battery power is available to operate relay 18 then sufficient battery voltage will be available to operate relay 21. Further, if a transistor thermal runaway occurs, a short weld time will result which is a fail safe feature.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a timing circuit the combination comprising; a switch means circuit, a D.C. current source, a capacitor, a transistor means in circuit with the source and capacitor and connected for passing charging current to the capacitor when the switch means circuit is in an open circuit position, a relay having a coil winding in circuit with the source and switch means circuit for being energized through the switch means circuit from said source when the switch means circuit is in a closed circuit position, a means including a circuit connected to provide a variable time discharge path for the capacitor through the switch means circuit and source when the switch means circuit is in the circuit closing position and a second relay connected in circuit to be energized through the transistor means and arranged to open said switch means circuit after the capacitor has discharged through the time delay circuit.

2. In a time delay circuit the combination comprsing; a D.C. current source, a timing capacitor, normally open switch means, cascaded transistor means responsive to the charge on the capacitor and connected in a circuit to charge the capacitor from the source when the switch means is in an open circuit position and a means in series circuit with the capacitor, switch means and source for providing a variable time rate discharge path for the capacitor when said switch means is in the closed circuit position.

3. In an electric circuit, the combination comprising; a first and a second relay, initiating means for closing a circuit from a D.C. current source to the first relay and a timing means for delaying current flow from the source to the second relay, said timing means including, a timing capacitor, a transistor circuit means responsive to the capacitor charge and connected in circuit with the capacitor and source for charging the capacitor from the source when the initiating switch is in an open circuit position, a normally open discharge circuit for the capacitor closeable when the first relay is energized and circuit means connecting the second relay in circuit with the transistor means for being energized through the transistor means whereby the second relay is energized a predetermined time interval after the first relay is energized.

4. A timing circuit for a portable welder comprising; a storage battery, a weld relay, a time delay relay, a capacitor, a time rate discharge circuit for the capacitor, an initiating switch connected in a circuit for closing an energizing circuit between the battery and weld relay and for connecting the discharge circuit to the capacitor when the switch is closed and a transistor means having electrodes connected to the capacitor and time delay relay in a circuit with the battery for charging the capacitor when the switch is open and energize the delay relay after the capacitor is discharged.

5. The combination as set forth in claim 4 wherein the time delay relay is sensitive to a lower voltage than the weld relay.

6. In a timing circuit including; a D.C. current source, a transistor, an initiating switch, and a capacitor, a circuit means connected in circuit with the capacitor so the capacitor is charged with one polarity through the transistor from the source when the initiating switch is open and is discharged through the switch and source and charged with the opposite polarity when the switch is closed.

7. In a timing circuit including; a D.C. current source, an initiating switch, a transistor and a capacitor, circuit means including a time rate circuit connected to the capacitor so the capacitor is charged from the source through the transistor when the switch is in the open circuit position and is connected through the time rate circuit in series with and in opposition to the source when the switch is in the closed circuit position.

8. A timing circuit including; a D.C. current source, an initiating switch, a transistor, a capacitor, circuit means including a time rate discharge path, said circuit means being connected to the capacitor so the capacitor is charged from the source through the transistor when the switch is in the open circuit position and the time rate discharge path and capacitor are connected in series with the source when the switch is closed.

9. In a time delay circuit the combination comprising; a D.C. current source, a timing capacitor, normally open switch means, transistor means having a control electrode connected to be responsive to the charge on the capacitor, said control electrode being connected in a series circuit with the capacitor to provide a charging circuit from the source when the switch means is in an open circuit position and a means in series circuit with the capacitor, the source and the switch means providing a variable time rate discharge path for the capacitor when said switch means is in the closed circuit position.

References Cited in the file of this patent

UNITED STATES PATENTS

| | | |
|---|---|---|
| 2,591,810 | Hart | Apr. 8, 1952 |
| 2,867,754 | O'Bleness | Jan. 6, 1959 |

OTHER REFERENCES

"A Transistor Timer," Radio and Television News, October 1953, pages 68, 69 and 187.